United States Patent [19]

Sigerist

[11] Patent Number: 4,614,488

[45] Date of Patent: Sep. 30, 1986

[54] OVERLAY MOLDING PRESS

[75] Inventor: Helmut Sigerist, Fort Langley, Canada

[73] Assignee: Venturetech Enterprises, Inc., Vancouver, Canada

[21] Appl. No.: 751,013

[22] Filed: Jul. 2, 1985

[51] Int. Cl.[4] .............................................. B29B 11/12
[52] U.S. Cl. ................................. 425/233; 425/405 R; 425/421; 425/DIG. 30
[58] Field of Search ............... 425/405 R, 405 H, 408, 425/409, 233, 424, 369, 328, 330, 333, 410–416, 419–421, DIG. 30, DIG. 41, 423, 431, 432, 456; 156/580, 581

[56] References Cited

U.S. PATENT DOCUMENTS

| | | | |
|---|---|---|---|
| 1,229,899 | 6/1917 | Darling | 425/330 |
| 2,027,164 | 1/1936 | Grubman | 425/408 X |
| 2,274,060 | 2/1942 | Hart | 425/DIG. 30 |
| 2,664,593 | 1/1954 | Larson | 425/DIG. 30 |
| 2,859,478 | 11/1958 | Glasson | 425/408 |
| 2,902,714 | 9/1959 | Johnson | 425/408 X |
| 2,964,791 | 12/1960 | McFarland | 425/408 X |
| 3,171,163 | 3/1965 | Ford et al. | 425/DIG. 30 |
| 3,196,485 | 7/1965 | Battenfeld et al. | 425/408 |
| 3,712,785 | 1/1973 | Hirt et al. | 425/405 R |
| 4,157,887 | 6/1979 | Sothje | 425/405 H |

Primary Examiner—Richard L. Chiesa
Attorney, Agent, or Firm—Kolisch, Hartwell & Dickinson

[57] ABSTRACT

An overlay molding press which includes a pair of oppositely disposed jaw members. Each jaw member is provided with an elongate shoulder extending therealong and each jaw member has a forming surface extending its length with an edge of the surface at the shoulder of the jaw member. The forming surfaces of the two jaw members collectively form a mold cavity. The jaw members are rockable about an axis extending where their shoulders meet to produce a folding together of their forming surfaces and a decrease in the lateral dimension of the mold cavity.

5 Claims, 4 Drawing Figures

OVERLAY MOLDING PRESS

BACKGROUND AND SUMMARY OF THE INVENTION

This invention relates to a press, and more particularly to a molding press for forming and pressing an overlay to an elongate work piece.

A work piece such as a strip of molding generally maybe described as having a substantially uniformed cross-section extending along its length. The outer surface of the strip, however, in a transverse direction may have a relatively complex arrangement of curves and shoulders. As a consequence it is extremely difficult if not impossible to cover the peripheral surface of the molding strip with an overlay, such as a decorative veneer overlay, without tearing, cracking, or otherwise impairing the overlay material.

The press of this invention features a pair of elongate jaw members cooperatively defining between them an elongate mold cavity for receiving the work piece to which an overlay is to be applied. The jaw members are constructed and arranged to rock toward each other about an axis which substantially corresponds to the base of the cavity defined between the jaw members. The rocking of the jaw members causes the cavity to decrease in lateral size with the jaw members in effect folding together against the sides of the workpiece. As a result, an overlay is in a progressive manner forced against the sides of the workpiece while conforming to the profile curving to the piece.

A general object of the invention, therefore, is to provide an overlay molding press effective to shape and then bond an overlay to an elongate workpiece, such as a piece of molding, and which is particularly adapted to perform this operation where the workpiece has complex profile curvature.

A more specific object is to provide such a press which features a pair of relatively rockable jaw members defining between them a mold cavity for receiving the workpiece and overlay.

A still further object is to provide a molding press where such jaw members relatively rock about an axis extending substantially at the base of a mold cavity defined between them, and which further includes means for both rocking the jaw members to decrease the lateral dimension of the mold cavity and means for pressing material downwardly into the mold cavity.

In a preferred embodiment of the invention, the press contemplated may be constructed as an elongate unit assembly, and a multiplicity of such assemblies supported on a conveyor, such as a wheel, affording substantially continuous production from the assemblies and loading and unloading at specific locations with respect to the wheel.

These and various other objects and advantages are attained by the invention, which is described hereinbelow in conjunction with the accompanying drawings, wherein.

Figure 1:
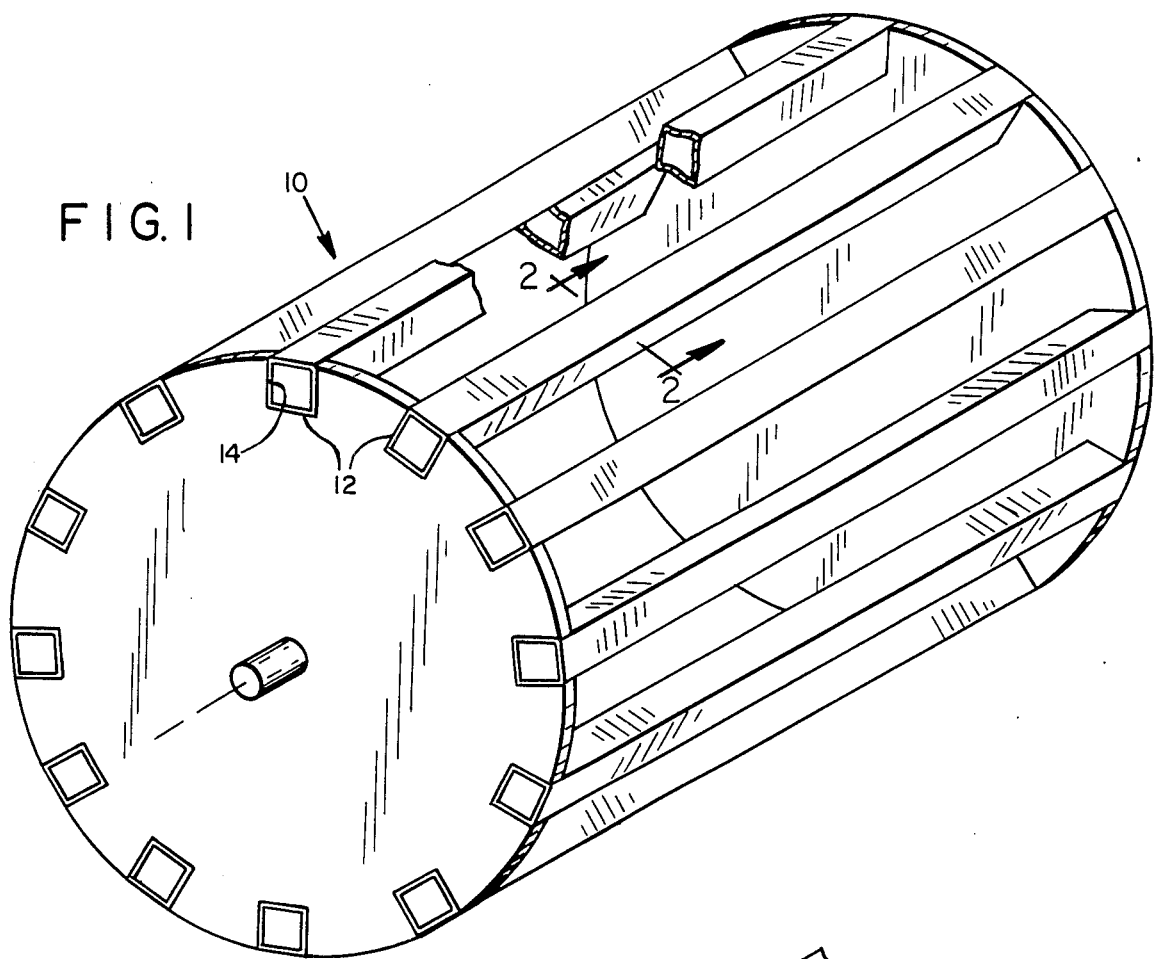
FIG. 1 is a perspective view, somewhat simplified, illustrating a production wheel and the distribution of press assembly units about the periphery of the wheel.

Referring now to the drawings, illustrated in FIG. 1 is what is referred to herein as a production wheel indicated generally at 10. Distributed about the periphery of this production wheel are a plurality of press assembly units 12 constructed in a manner to be described in greater detail below. The press assembly units seat within channels 14 appearing at regular intervals about the perimeter of the production wheel. By providing the press assembly units with such distributed about the wheel, it is possible to load and unload the respective units at predetermined stations located with respect to the wheel. Clamping of the work and curing of any adhesive employed in the bonding of the overlay occurs as a press assembly unit is carried with rotation of the wheel from the loading to the unloading station.

Each press assembly unit is housed in an elongate cartridge housing 16. As probably best illustrated in FIG. 2, such may comprise an elongate tube of rectangular cross section shown at 18 which may if desired be strengthened by the inclusion of stiffening ribs, such as stiffening rib 20 distributed along the length of the housing. For the most part, components of the press of the invention are contained within the interior of this tube 18.

Figure 2:
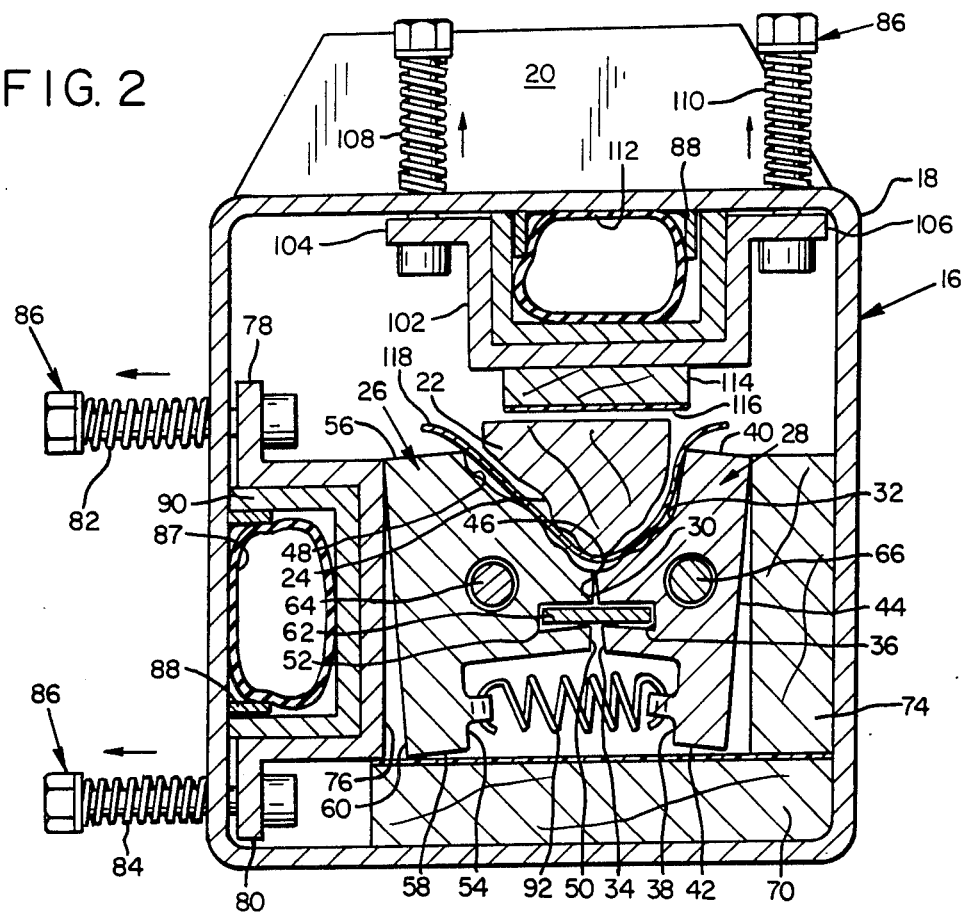
FIG. 2 is a cross sectional view taken generally along the line 2—2 in FIG. 1, and on a slightly enlarged scale, illustrating details of a press assembly unit and showing jaw members therein in a relatively open position and ready to receive material to be processed.

Referring to FIG. 2, a workpiece to be overlaid is shown in cross section at 22. Such may comprise a piece such as an elongate strip of molding. The cross-section of the piece is substantially uniform extending along the length of the piece. However, in a direction extending transversely of the workpiece, the peripheral surface 24 of the workpiece has a relatively complex contour of curves and ridges. The workpiece illustrated, therefore, is of the type which can be advantageously processed with the press of the invention in the application of a bonded overlay to the piece.

The press is provided with a pair of elongate jaw members shown in cross-section at 26, 28 extending longitudinally of and within the interior of housing 16.

Considering specifics of these jaw members, jaw member 26 includes a relatively sharp shoulder shown at 30 which extends along its length. Extending along the length of this jaw member and with an edge thereof located at shoulder 30 is an elongate forming surface 32. The surface in a longitudinal direction, therefore, parallels shoulder 30. The transverse profile of forming surface 32 substantially matches the profile of that portion of the peripheral surface of workpiece 22 which is shown located above it in FIG. 2.

Progressing downwardly from shoulder 30, jaw member 26 is provided with a rearwardly inclined surface 34 interrupted by a longitudinally extending indented channel 36, and below the lower edge of surface 34, a shelf 38. Forming the top and bottom of the jaw member are substantially flat surfaces 40, 42. Bounding the jaw member along its right side, as illustrated in FIG. 2, is lateral side 44.

Jaw member 28 is similar in construction. Thus, such has a longitudinally extending shoulder 46, which parallels shoulder 30 of jaw member 28 and lies against it. Bounding an upper portion of the jaw member is an elongate forming surface 48 with an edge adjacent shoulder 46 and a transverse profile substantially matching the profile of that portion of workpiece surface 24 which lies above it in FIG. 2. Extending downwardly from the forming shoulder is a rearwardly inclined surface 50 interrupted by channel 52. A shelf is shown at 54. Flat surfaces 56, 58 form the top and bottom of the jaw member, and the left side of the jaw member, as illustrated in FIG. 2, is formed by lateral side 60.

The jaw members are located with respect to each other by a hinged plate 62 which may take the form of an elongate metallic strip with opposite expanses seated within channels 36, 52.

The construction described is one which permits the jaw members to rock with respect to each other about an axis which extends longitudinally of the jaw members and coincides with the elongate region where shoulders 30, 46 abut each other.

Forming surfaces 32, 48 cooperate to define an elongate, substantially uniformally cross-sectioned open-top mold cavity which extends between the jaw members and is bottomed by margins of the forming surfaces adjacent shoulders 30, 46. This mold cavity faces upwardly in FIG. 2. With the jaw members positioned as illustrated in FIG. 2, this mold cavity at its top has a width which exceeds the top side-to-side dimension of workpiece 22.

In the usual instance, the press will be provided with heater means for heating the jaw members. Such heater means takes the form of elongate heating rods shown in cross section at 64, 66 extending the length of the jaw members within suitable accommodating bores.

The jaw members seat within an elongate channel. This channel is formed at its base by an elongate pad shown in cross section at 70 surfaced along the top thereof with a low coefficient of friction wear surface, such as the Teflon layer illustrated at 72.

One side of the channel receiving the jaw members is provided by an elongate piece of substantially rectangular cross section shown at 74. The other side of the channel is formed by an elongate side clamp element shown in cross-section at 76.

Side clamp element 76 is a substantially channel-shaped member terminating in longitudinally extending flanges 78, 80. The side clamp element is biased to the left in FIG. 2 by coil spring sets exemplified by coil springs 82, 84 provided at regular intervals along the length of the assembly unit. Each coil spring encircles the shank of a nut and bolt assembly, as illustrated by assembly 86, such shank also passing through a portion of a flange in the side clamp element and the wall of housing tube 18. By urging the nut and bolt assembly laterally outwardly of the housing tube, the side clamp element is urged to a position closely adjacent the wall of the housing tube.

Means is provided for shifting the side clamp element laterally inwardly against the biasing of the various coil springs. In the press illustrated such takes the form of an elongate air bag which extends the length of the press, and which seats within a space bounded by elongate retainer flanges 88 which are an integral part of the housing, and channel member 90 fitted within the interior of the side clamp element.

Figure 3:
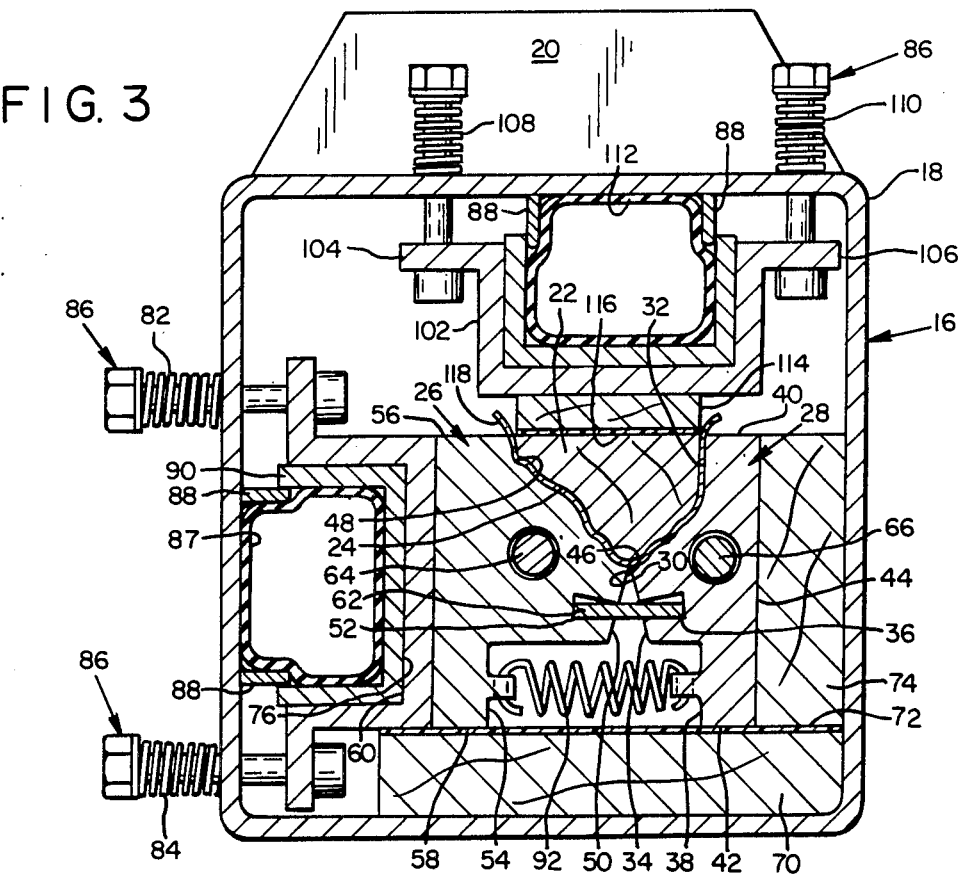
FIG. 3 is a cross sectional view similar to FIG. 2, but showing the jaw members folded together and applying pressure to an overlay with such overlay covering the surface of a workpiece.

With introduction of air under pressure to air bag 87, the side clamp element is shifted against the biasing of springs 82 laterally inwardly, as best illustrated by comparing FIGS. 2 and 3. When this occurs, the jaw members are compressed between the side clamp element and piece 40 which lies opposite the side clamp element. This also is accompanied with rocking of the jaw members about an axis coinciding with where shoulders 30, 46 meet. Jaw member 26 rocks in a clockwise direction in FIG. 2, and jaw member 28 locks in a counterclockwise direction. With such rocking movement the forming surfaces of the two jaw members swing toward each other to reduce the side-to-side dimension of the mold cavity, with the forming surfaces in effect folding inwardly about the exterior surface of the workpiece placed therein between.

The side clamp element and piece 74 cooperate to form a press means engaging with sides of the jaw members for effecting rocking of the jaw members.

Such rocking movement is yieldably resisted by coil springs distributed along the length of the jaw members in the space provided by shelves 38, 54, and as exemplified by the coil spring shown at 92. The coil spring has opposite ends suitably anchored in the respective jaw members, and the coil springs collectively urge rocking movement in the jaw members in a direction causing opening up of the mold cavity at the top of the jaw members.

Illustrated at 102 is a top clamp element, which is an elongate channel-shaped piece generally resembling side clamp element 76, and which extends along the length of the press. Such terminates in flanges 104, 106. The top clamp element is biased upwardly by coil spring sets, exemplified by the set illustrated including coil springs 108, 110.

An elongate air bag 112 located within the interior of the top clamp element and mounted in a manner similar to the mounting for air bag 87 is extended with the introduction of air under pressure to shift the top clamp element downwardly against the biasing of the coil springs. An elongate pad illustrated in cross section at 114, surfaced with Teflon layer 116, extends the length of the side clamp element and is secured thereto and provides a low coefficient of friction surface for directly engaging the workpiece element.

With downward movement of the top clamp element, and with a workpiece within the mold cavity, such workpiece is engaged by the clamp and forced downwardly into the mold cavity.

Describing now the general operation of the press, the press is in condition for loading of material with the parts of the press as illustrated in FIG. 2. With the press in this condition, a workpiece is inserted into the press with such loosely occupying the mold cavity. Arranged between the workpiece and the mold cavity is the overlay sheet which is to be applied, which may have an adhesive layer provided over the surface thereof which faces the workpiece and which is illustrated in FIG. 2 at 118.

With the material loaded, air bag or powered means 87 is inflated to cause the side clamp element to move inwardly to produce rocking of the jaw members. Furthermore, and usually after some initial movement of the side clamp element, bag or powered means 112 is inflated to produce downward movement of the top clamp element. As the jaw members rock, their forming surfaces swing together, in effect folding about the workpiece and forming the overlay about the contour of the workpiece. The parts finally position themselves as shown in FIG. 3 with the mold cavity now conforming in side-to-side dimension to the side-to-side dimension of the workpiece and with the workpiece forced downwardly by the top clamp element.

Figure 4:
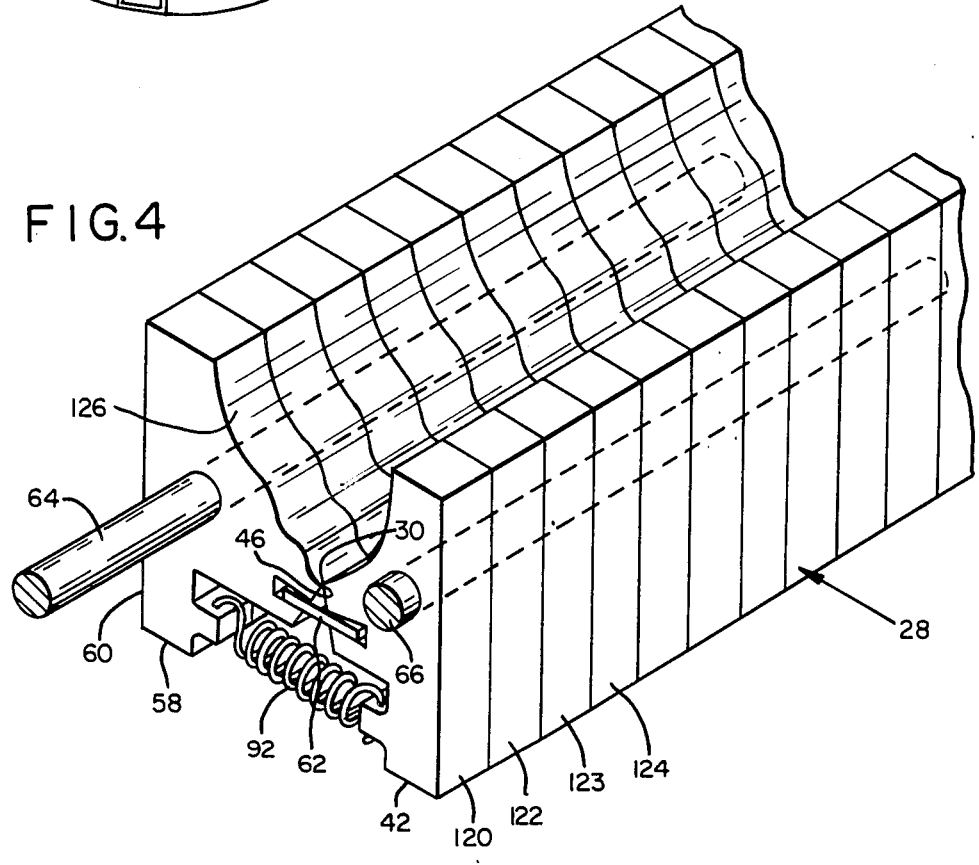
FIG. 4 is a perspective view of portions of jaw members in a press, with the jaw members prepared from a plurality of plate segments with matching profiles and arranged in a row.

FIG. 4 is a perspective view of portions of a pair of jaw members illustrating a manner in which such may be constructed. Referring to this figure, it will be seen that jaw member 28 therein shown is formed from a series of matching plate segments designated at 120, 122, 123, 124. Each is provided with a profile surface, such as surface 26 shown for plate segment 120, that conforms to the contour of the workpiece to be overlaid. The plate segments are arranged in a row, with one following another along the length of the row, and the plate segments collectively form the jaw member. The profile surfaces of various plate segments collectively provide the forming surface in the jaw members.

In a press assembly unit, one jaw member may be replaced with another having a forming surface of a different configuration, in the overlaying of a workpiece having a different cross-sectional contour. Alternatively, both the jaw members may be replaced with jaw members having profile surfaces of still other configurations, in the overlaying of workpieces of still other cross-sectional profiles. The press construction described permits a great deal of flexibility in the type of workpiece to be processed by the press.

While an embodiment of the invention has been described herein, as well as certain variations in its construction, it should be obvious that other modifications and variations are possible without departing from the inventive concept of the press.

It is claimed and desired to secure by Letters Patent:

1. A press for applying an overlay to an elongate component comprising:

a pair of elongate opposed jaw members, each jaw member having a shoulder extending along the length thereof and an elongate forming surface paralleling said shoulder with an edge of said surface located at said shoulder, said jaw members being disposed with their said shoulders substantially parallel and meeting each other and their said forming surfaces cooperating to define the inwardly sloping sides and bottom of an elongate substantially uniformly cross-sectioned, open-top mold cavity extending between the jaw members, press means opposing the open-top of said mold cavity actuatable to force a component lodged within the cavity further within the cavity, and means mounting said jaw members for relative rocking movement about an axis extending along the region where said shoulders meet whereby the sides of the cavity defined by said forming surfaces swing toward each other.

2. The press of claim 1, which further comprises powered means coactable with the jaw members to effect rocking of the jaw members.

3. The press of claim 1, wherein the jaw members have opposed lateral sides disposed laterally of the cavity, and which further comprises another press means engageable with said lateral sides for effecting rocking of the jaw members.

4. The press of claim 1, wherein the jaw members have opposed lateral sides, and the press further includes opposed press members defining the sides of a jaw-member-receiving channel, said jaw members being lodged within said channel with said lateral sides of the jaw members facing said opposed press members, and means coactable with said press members to press them together against the lateral sides of the jaw members.

5. The press of claim 4, which further comprises an elongate cartridge housing, and wherein said jaw members, said press means, and said opposed press members are enclosed within said housing.

* * * * *